United States Patent [19]

Roberts

[11] Patent Number: 4,704,322

[45] Date of Patent: Nov. 3, 1987

[54] RESIN RICH MICA TAPE

[75] Inventor: Jonathan Roberts, Raymond, N.H.

[73] Assignee: Essex Group, Inc., Ft. Wayne, Ind.

[21] Appl. No.: 910,052

[22] Filed: Sep. 22, 1986

[51] Int. Cl.$^4$ .......................... H01B 3/40; H01B 3/04
[52] U.S. Cl. ................................. 428/251; 428/268; 428/324; 428/454; 428/702
[58] Field of Search ............... 428/324, 268, 251, 454, 428/702

[56] References Cited

U.S. PATENT DOCUMENTS

| | | | |
|---|---|---|---|
| 3,776,978 | 12/1973 | Markovitz | 260/831 |
| 4,085,250 | 4/1978 | Smith | 428/418 |
| 4,374,892 | 2/1983 | Roberts | 428/233 |
| 4,512,928 | 4/1985 | Sugerman et al. | 260/410.9 |

OTHER PUBLICATIONS

Salvatore J. Monte, Y. G. Sugerman, *Processing of Composites with New Neoalkoxy Titanate Coupling Agents*, Revision of talk given to Society of Plastics Engineers, Apr. 10-11, 1984, Luxembourg.

S. J. Monte and G. Sugerman, "Titanate Coupling Agents—Developments 1981", Elastomerics, Jul. 1983, pp. 30-34.

S. J. Monte and G. Sugerman, "Conclusion of Titanate Coupling Agents—Developments 1981", Elastomerics, Aug. 1983, pp. 29-31.

*Primary Examiner*—Marion C. McCamish
*Attorney, Agent, or Firm*—Alan C. Cohen

[57] ABSTRACT

This invention is for a resin rich, electrically insulating tape comprising a layer of mica and at least one layer of an electrically insulating scrim, wherein the tape is impregnated with an epoxy-phenolic novolac resin having about 0.1 percent to about 0.5 percent by weight of the mica of an alkoxy titanate. The tape will have an excellent shelf life, rapid cure to form stability and superior moisture resistance. Also described is a method for manufacturing such a resin rich tape.

8 Claims, 2 Drawing Figures

RESIN RICH MICA TAPE

TECHNICAL FIELD

The technical field to which this invention pertains is composite insulation with structurally defined elements, in particular, insulation having a composition containing mica.

BACKGROUND ART

B-staged, resin rich, electrically insulating tapes have been known for many years. These tapes find one of their greatest uses in large rotating electrical machines or high voltage motors. Typically, these tapes comprise an epoxy resin impregnated mica in the form of flakes, splittings or paper, supported on an electrically insulating scrim. The impregnating resin is then B-staged or partially cross-linked during the manufacturing process. Then, since the material in the B-staged state is manufactured in large sheets, these sheets are slit into desired widths to form the tapes, which may later be used to wrap about an electrical conductor to be insulated and placed in an oven where, under heat or heat and pressure, the resin is cured.

Although these tapes are being used presently, they are not without certain drawbacks. First, manufacturers are constantly trying to develop a tape in which the resin can be B-staged and then remain flexible for long periods of time to extend the shelf life of such tapes. However, the designers of such tapes must not make a tape system which will require long periods of time at temperature and pressure to cure the resin about the substrate, as this will add significant costs to the process.

Second, the physical properties of the cured insulation are important, such as the high flexural strength and low dissipation factors which are necessary to meet the electrical and physical properties required in the industry.

Third, since mica paper based products are not very stable in a moisture bearing environment, a tape having improved moisture resistance would also be desirable.

Therefore, what is needed in the art is a resin rich, electrically insulating tape which is stable in the B-staged condition for good shelf life, yet is rapid curing, while having high flexural strength, low dissipation factor and improved moisture resistance when cured.

DISCLOSURE OF INVENTION

The present invention teaches a B-staged, epoxy-phenolic novolac, resin rich, mica insulting tape comprising a layer of mica supported by at least one layer of an electrically insulating or nonconductive scrim, said mica paper impregnated with an epoxy-phenolic novolac resin wherein the improvement comprises the addition to the epoxy-phenolic novolac resin of about 0.1 percent to about 0.5 percent by weight (based on the weight of mica) of an alkoxy titanate, said tape will have excellent shelf life in the B-staged condition and improved water resistance, low dissipation factor and high flexural strength when cured as well as possessing a rapid cure cycle.

Another aspect of the invention is a cured electrically insulating epoxy-phenolic novolac, impregnated, mica tape which has excellent dielectric strength, dissipation factor, improved moisture resistance and high flexural strength.

Another aspect of the invention is a method of making the resin rich tape of the present invention.

Also taught in this invention is a method of using the resin rich tape of the present invention.

Other features and advantages will be apparent from the specification and claims and from the accompanying drawings which illustrate an embodiment of the invention.

BEST MODE FOR CARRYING OUT THE INVENTION

Figure 1:
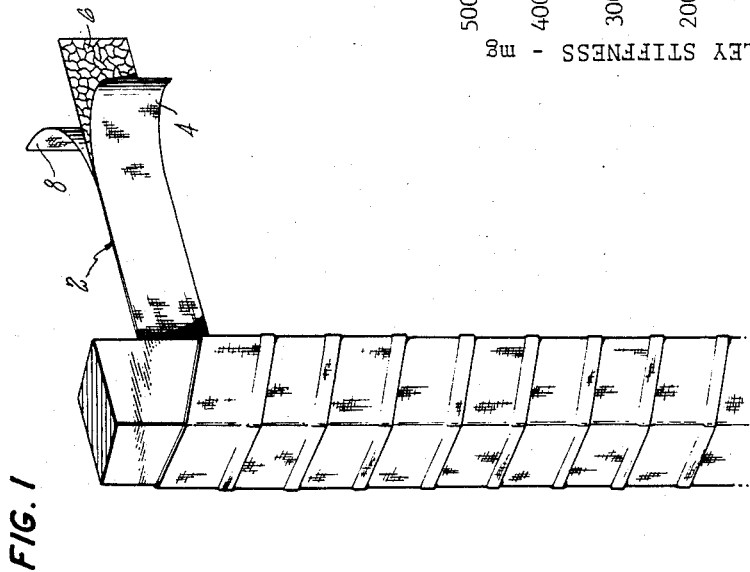
FIG. 1 depicts a resin rich tape wrapped around a coil.

FIG. 1 depicts the resin rich mica tape 2 of the present invention wrapped about an electrically conductive substrate 3. The typical tape 2 of the present invention will comprise an epoxy-phenolic novolac resin impregnated mica layer 6 having disposed on either side electrically insulating scrims or supports 4 and 8. These scrims may be made of the same material or different insulating materials.

The scrims or sheet backing supports 4 and 8 should be made of an electrically insulating or nonconductive material such as glass cloth, cellulose polyester, polyester terephthalate or the like and may be in the form of felted fibers, woven or braided cloth or such similar construction. Such materials are conventional and well known. These scrims are typically very thin ranging in thickness from about 0.5 mils to about 10 mils with about 0.8 mils to 3 mils preferred.

Between these scrims is placed, by any conventional and traditional means, a layer of mica which may be in the form of water disintegrated-integrated mica paper, calcined mica paper, mica flakes, flake paper or splittings. The mica is commonly available in industrial varieties which are based on muscovite or phlogopite mica. The phlogopite has the higher thermal properties and coefficient of thermal expansion. The thickness of the mica layer on the tape of the present invention should be about 2 mils to about 10 mils with about 3 mils to about 6 mils being preferred.

After the mica layer is applied to the scrim, the epoxy-phenolic novolac resin is impregnated into the mica. Again, this is done using conventional techniques such as brushing, dripping, spraying, coating etc. The resin should have a viscosity in the range of about 10 cps to about 50 cps at 25° C. to enhance its ability to fully impregnate the mica. However, higher viscosity resins may be used when means other than gravity or vacuum are used to aid the impregnation process, such as heating.

Typically, the resin which is introduced into the mica will result in amounts ranging from about 20 percent by weight to about 50 percent by weight of the total composite. These figures vary depending on the type of mica used and the final processing properties desired. However, too much resin will create problems of oozing or flowing of the resin out of the tape during the final processing and too little resin will create voids in the final insulation leading to reduced dielectric properties.

The particular epoxy-phenolic novolac resin used will be determined, again, by the particular system desired. However, any conventional epoxy-phenolic novolac resin may be used. Typically, such a resin system is comprised of an epoxy resin to which is added a phenolic accelerator. Each of these components are conventional in nature and selected to react and cure at the desired temperatures to a stable set.

The epoxy thermosetting resin may be any epoxy resin having 1, 2 epoxy groups, additionally, the resin should contain more than one epoxy group per molecule. The epoxy resin may be a cycloaliphatic epoxy resin, such as bis(3,4-epoxy-6-methyl-cyclohexyl methyl) adipate, vinyl cyclohexane dioxide, or glycidyl ethers of poly phenols epoxy resin such as bisphenol A diglycidyl ether epoxy resin, phenol formaldehyde novolac polyglycidyl ether epoxy resin, epoxy cresol novolacs or mixtures thereof. This list should not be considered exhaustive as any 1, 2 epoxy would work depending on the particular combination of phenolic accelerator and titanate selected.

The preferred epoxy resins are the cycloaliphatic epoxy resins such as 3, 4-epoxy cyclohexyl methyl-(3,4-epoxy) cyclohexane carboxylate such as ERL 4221 sold by Union Carbide Plastics Company or Cy 179 sold by Ciba Geigy.

The phenolic novolac accelerator which is added to the epoxy resin to aid in cross-linking of the epoxy resins are those commonly known, i.e. bis phenol A, pyrogallol, catechol, hydroquinone, etc. to react with these epoxies and would be known to those skilled in the art and need not be listed here. However, the preferred phenolic novolac resin is available as EA 606 by Reichhold Corporation.

The phenolic accelerator may be mixed with the epoxy resin in quantities ranging from stoichiometric down to less than 1 percent by weight of the epoxy resin depending on the epoxy system chosen. The accelerator selected, the epoxy resin and the titanate chosen should result in the entire resin system designed to achieve the cure rate and physical properties desired for the particular application. Typically, and preferably the phenolic accelerator is present in amounts ranging from about 0.5 percent by weight to about 15 percent by weight of the epoxy resin.

The above epoxy and phenolic constituents of this invention are, as has been stated, conventional and the combination and reactions to produce a desired resin system would be known to one skilled in the art or are easily determined with simple experimentation. Indeed the number of epoxy resins listed and the phenolic accelerators cited represent the more common ones and should not be understood to exclude other epoxy resins or phenolic accelerators which could be used to practice the invention.

These resin constituents are often mixed in conventional solvents to lower their viscosity and aid in producing a homogenous impregnant. The solvents used are conventional acetone, xylene, toluene, methyl ethyl ketone, etc. and the resin concentration will typically be about 20 percent to about 50 percent solids.

The important feature of the present invention is the introduction into the resin mixture (the epoxy resin and the phenolic novolac accelerator) of an alkoxy titanate. A list of typical monoalkoxy and neoalkoxy titanates is shown in the Table below:

TABLE I

Neoalkoxy, triisostearoyl titanate
Neoalkoxy, dodecylbenzenesulfonyl titanate
Neoalkoxy, tri(dioctylphosphato) titante
Neoalkoxy, tri(dioctylpyrophosphato) titanate
Isopropyl, tri(dioctylpyrophosphato) titanate
Isopropyl, triisostearoyl titanate
Isopropyl, trimethacryl titanate
Isopropyl, triacryl titanate
Isopropyl, tri(tetraethylene triamino) titanate
Isopropyl, tri(dioctylphosphato) titanate
Tri(butyloctylpyrohosphato) isopropyl titanate These particular alkoxy titanates (the term as used in this document includes both monoalkoxy and neoalkoxy titanate), as well as others, are available from Kenrich Petrochemicals, Bayonne, New Jersey. Once again the disclosure herein should not be limited to these particular alkoxy titanates. Any number of other similar alkoxy titanates may be used to practice this invention. The preferred alkoxy titanate is the monoalkoxy tri(dioctylpyrophosphato) titanate sold by Kenrich as KR38s. These titanates are added to the resin system in quantities ranging from about 0.1 percent by weight to about 0.5 percent by weight as a percentage of the mica in the tape. The amount will vary again depending on the resin system and the cure profile desired of the final tape.

It is these particular titanates which impart the improved moisture resistance properties of the final cured product as well as the increased shelf life of the B-staged tape yet supply the rapid curing desired of these systems. The theory as to exactly how these titanates achieve this result has not been clearly defined.

The impregnated tape is then passed through a drying oven to remove any solvent which may be present in the resin and partially cure the resin, or B-stage it, by heating it to a temperture which is high enough to start the cross-linking process between the epoxy resin and the penolic accelerator. Once the required extent of cross-linking has been accomplished, the tape is cooled to room temperature (below about 100° F.) and placed on a take-up roll.

The temperatures and length of time the resin is exposed to temperature as well as the amount of cross-linking of the resin to reach an acceptable B-staging is specific to each resin system and would be a matter of simple experimentation to determine. However, typically the impregnated tape is heated to temperatures ranging from about 120° C. to about 160° C. and exposed to these temperatures for periods of time ranging from about 1 to about 10 minutes.

The tape is B-staged when the epoxy is in a solid state but not cured, dry to the touch and nontacky containing less than about 5 percent by weight of any solvent and the resin is capable of fusion or further cross-linking when heated.

The B-staged tapes are then ready for application to the substrate and final cure. The application consists of conventionally wrapping the substrate in such a manner so as to completely cover the substrate. The wrapped substrate is then placed in position within the unit in which it will be used and the unit is exposed to heat and pressure sufficient enough to cure the resin. Conventional curing ovens at temperatures of about 275° F. (135° C.) to about 356° F. (180° C.) will be sufficient to cure the typical resins described herein. One of the primary advantages of this particular resin system is that the curing times of these resin systems is considerably shorter than that of the prior art resin systems as demonstrated in the test data below. These resin systems ideally will cure to a stable form within about one hour at their curing temperature, which is considerably shorter than the average time of sixteen hours at temperature required by the prior art resins. Clearly this makes these resin systems attractive as it increases productivity and decreases the cost of manufacture where these resin systems are used. In addition, the shortened curing time will reduce the amount of resin oozing which takes place over time with prior art resins.

EXAMPLE

Three different samples were manufactured to determine the effect of the alkoxy titanates on the stability of the B-staged tape and the cured resin system. In particular, the properties of interest were the speed with which the resin would cure to a stable configuration, the electrical properties of the final cured tape as well as the storage stability of the tape in the B-stage condition.

To this end a base laminate 12 inches by 12 inches was made using a 2.0 mil glass scrim available from Burlington Corporation as 1297. Deposited on this scrim was a layer of muscovite mica paper 4 mils thick and atop this mica layer was placed a polyester mat 0.8 mils thick availble from Kendall Corporation as Webril SM 275-1.

A basic resin mixture was then prepared which would act as the control resin having no titanates present. The composition consisted of 418 grams of acetone, 149 grams of EA606 resin and 222 grams of CY179 resin. A second mixture of the titanate which was to be added to the control mixture was prepared by mixing 10 grams of KR38s (isopropyl tri(dioctyle pyrophosphato) titanate) with 90 grams of acetone. Thereafter, two 100 gram samples of the control resin were mixed with 2.2 grams of the titanate and 1.1 grams of the titanate mixture respectively resulting in mixtures "A" and "B" containing 0.47 percent and 0.23 percent by weight of solids of the resin in the mixtures respectively.

Three separate tape specimens using the basic laminate composition as described above were impregnated with about 30 percent by weight of resin by conventionally brushing the resin mixtures onto the tape specimens. (The percent by weight of impregnant is that percentage of the whole composition's weight.) The samples were then B-staged at 300° F. (150° C.) for about eight minutes and then stored at temperatures ranging from about 40° F. (4° C.) to about 100° F. (38° C.) to simulate typical storage conditions for tapes of this nature.

Figure 2:
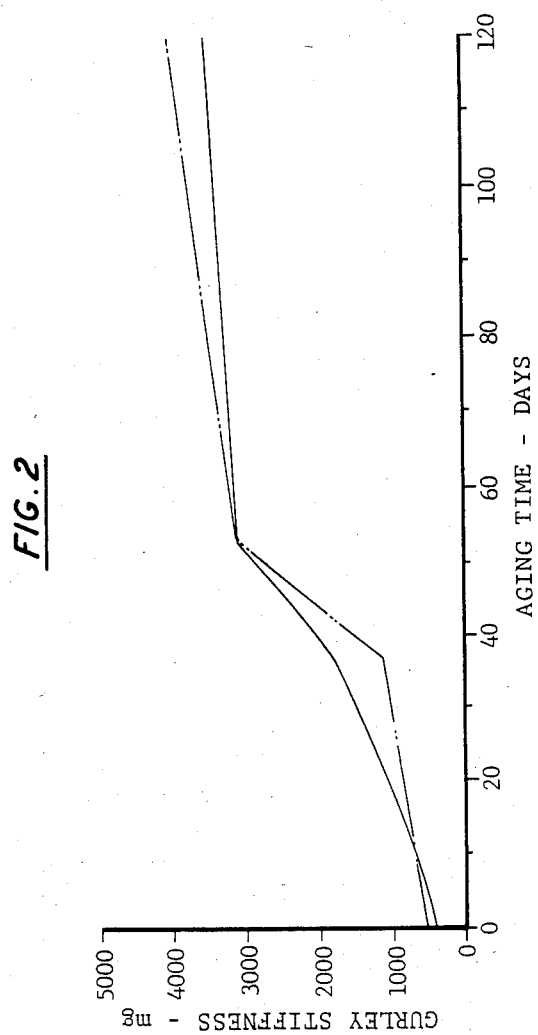
FIG. 2 is a graph of gurley stiffness testing over time of stored B-stage tape.

Periodically, portions of the control tape and the tapes having 0.47 percent titanate "A" were tested for their flexibility using the Gurley test which is an industry approved ASTM test. This test would indicate the advancement of cure taking place within the resin over time by the decrease in flexibility of the samples. As shown in FIG. 2, the flexibilty of both the sample with the titanate present sample "A", and the control sample do not show a marked difference in the flexibility even after storage of up to four months. Therefore, it appears that the titanate, even after B-staging will not adversely effect the storage of these resin rich tapes by advancing the cure during storage.

The samples were also subjected to testing to determine the rate of cure required to form a stable insulating layer about the intended substrate. The test entailed pressing two layers of each sample together for one hour at 50 psi and 300° F. (148.9° C.). The samples were then cooled under pressure and measured for thickness. The samples were then post-cured overnight (16 hours) at 300° F. (148.9° C.) at atmospheric pressure and measured again and tested for dissipation factor and flexural strength.

Table 2 represents the results of the two measurements to determine form stability of the cured resin. The test specimens were measured after the initial one hour cure and the same position on the specimen was again measured after the sixteen hour post-cure cycle. As may be seen, the control samples increased in thickness considerably while the titanate samples showed virtually no dimensional change. This data illustrates that form stability (virtually 100 percent resin cure) can be achieved after one hour exposure to 300° F. (150° C.) with this resin system.

TABLE 2

| Samples | % Thickness Increase | Resin Stroke Cure (@ 392° F.) |
|---|---|---|
| Control | 27.9% | 7 min., 53 secs. |
| 0.47% Titanate | 0.0% | 1 min., 30 secs. |
| 0.23% Titanate | 0.9% | 3 min., 26 secs. |

Table 3 shows the dissipation factor of the three test specimens at different voltages. As may seen, all three samples have acceptable dissipation factors.

TABLE 3

| | Dissipation Factor At 311° F. | | |
|---|---|---|---|
| VPM | Control | A | B |
| 10 | 1.4 | 3.1 | 2.5 |
| 20 | 1.5 | 3.1 | 2.6 |
| 30 | 1.5 | 3.1 | 2.6 |
| 40 | 1.5 | 3.2 | 2.6 |
| 50 | 1.5 | 3.2 | 2.6 |
| 60 | 1.5 | 3.2 | 2.6 |

It is of interest to note that the laminates prepared using the titanate exhibited the same dissipation factor regardless of the process cycle. That is, 8 hours press cure at 300° F. (150° C.) plus 50 psi versus one hour press cure at 300° F. (150° C.) plus 50 psi with an overnight post cure at 300° F. (150° C.). The control laminates having no titanates do exhibit a substantial difference. One explanation for this may be that the additional eight hours for the overnight post cure contributes to additional crosslinking of the epoxy.

In the past, it has been noted that the dissipation factor for press cured samples without titanates had improved if allowed to remain in the oven overnight indicating continued curing which is not seen with titanate.

Flexural strength on samples from each laminate was also determined prior to and after the post cure cycle. The results are as follows:

TABLE 4

| | Flexural Strength (psi) | | Angle of Break | |
|---|---|---|---|---|
| Sample # | Before | After | Before | After |
| Control | 10,800 | 16,800 | 73.3° | 32.0° |
| 0.47 | 33,600 | 27,000 | 36.0° | 38.8° |
| 0.23 | 36,000 | 32,100 | 37.8° | 41.5° |

This data further illustrates that the titanate resin is virtually 100 percent cured after exposure for one hour at temperatures (angle of break ≈36°) while the resin without titanate requires sixteen hours to reach the same cure state.

It is also believed that the introduction of the titanate into the resin system will, upon curing, improve the moisture resistance of the tape considerably over the prior resin system without the titanate.

As is demonstrated by this data through the addition of the alkoxy titanates into epoxy/phenol resin systems, it is possible to generate a resin rich mica tape which will be very stable in the B-staged condition to allow for convenient storage of the tapes prior to use, has acceptable dissipation factors, and excellent flexural strength after cure. However, the most significant achievement is that all of this may be achieved with a resin system that will cure to form stability in a much shorter curing cycle than the prior resin system. (Form stability as used in this art means that state at which the tape has cured sufficiently so that it is substantially dimensionally stable even through further heating cycles.) As is demonstrated, this cure cycle can be about one hour instead of sixteen hours, resulting in considerable savings in cost and increasing productivity.

It should be understood that the invention is not limited to the particular embodiments shown and described herein, but that various changes and modifications may be made without departing from the spirit and scope of this novel concept as defined by the following claims.

I claim:

1. An electrically insulating, resin rich, tape comprising a layer of mica and at least one layer of electrically insulating scrim, wherein the scrim and mica are impregnated with an epoxy-phenolic novolac resin containing about 0.1 percent to about 0.5 percent of an alkoxy titanate, based on the weight of mica, said resin having been partially crossed linked to form a B-staged, resin rich, electrically insulating tape having an improved shelf life, superior curing properties and upon curing, will have superior moisture resistance and flexural strength.

2. The article of claim 1 wherein the resin comprises about 20 percent to about 50 percent by weight of the tape.

3. The article of claim 2 wherein the titanate is monoalkoxy tri(dioctyl pyrophosphate) titanate.

4. The article of claim 1 wherein the scrim is a thin electrical grade, glass woven cloth.

5. The article of claim 4 wherein the epoxy is a cycloalaphatic and the phenol is a phenolic novolac.

6. An electrically conductive substrate wrapped with a resin rich, B-staged epoxy-phenol novolac resin impregnated mica tape wherein the resin contains an alkoxy titanate.

7. A method of making a resin rich, electrically insulating mica tape comprising:
    forming a structure having a layer of mica and at least one layer of electrically insulating scrim;
    impregnating said structure with about 20 percent to about 50 percent by weight of the tape, with an epoxy-phenolic novolac resin containing about 0.1 percent to about 0.5 percent by weight of an alkoxy titanate based on the weight of the mica; and
    heating the impregnated tape to a sufficient temperature and for a sufficient length of time to partially cross link the resin thereby forming the B-staged resin rich, electrically insulating tape, having excellent shelf life and curing properties.

8. A method of applying a resin rich mica tape to an electrically conductive substrate comprising:
    wrapping a B-staged resin rich mica tape impregnated with about 20 percent to about 50 percent by weight of the tape with an epoxy-phenolic novolac resin having about 0.1 percent to about 0.5 percent by weight of an alkoxy titanate, based on the weight of mica; and
    heating the tape wrapped substrate to a temperature in excess of the curing temperatures of the resin for about one hour to cure the resin resulting in a form stable, electrically insulated conductor.

* * * * *